Jan. 26, 1926.  
F. L. WALKER, JR  
1,570,803  
METHOD FOR STARTING AN ARC IN A WELDING APPARATUS AND THE LIKE  
Filed Feb. 9, 1925      2 Sheets-Sheet 1
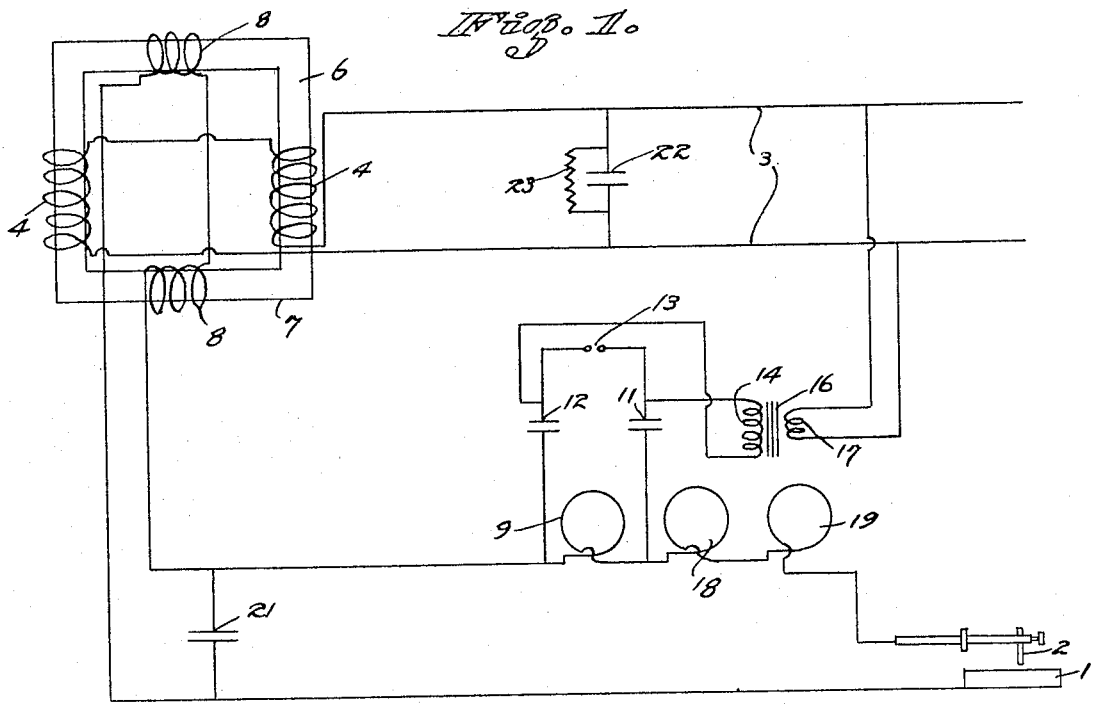
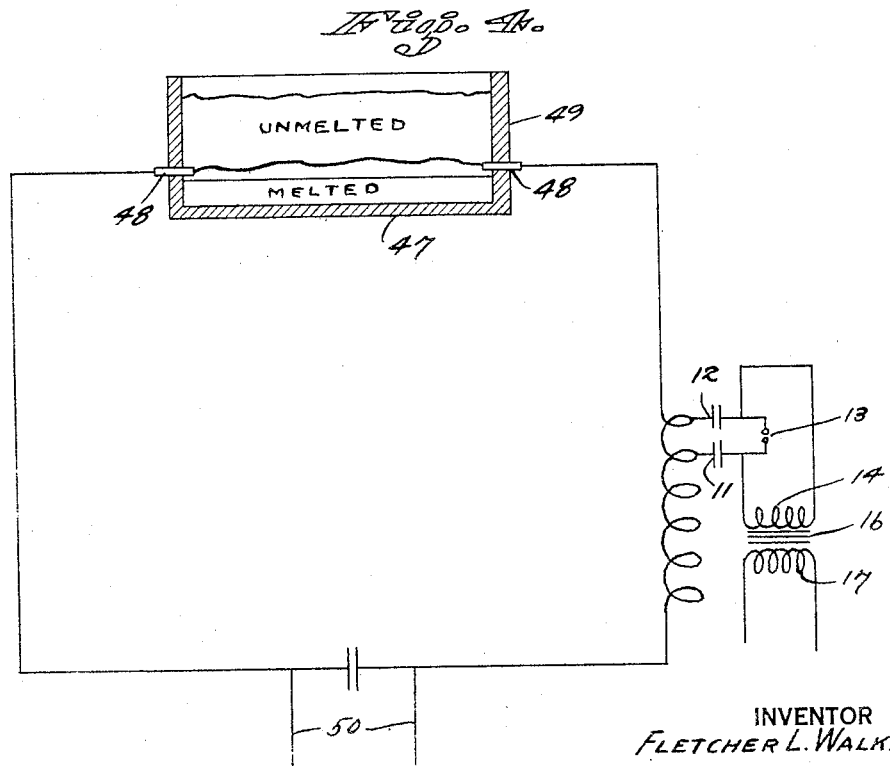
INVENTOR  
FLETCHER L. WALKER, JR,  
BY  
ATTORNEY Jan. 26, 1926.
F. L. WALKER, JR
1,570,803
METHOD FOR STARTING AN ARC IN A WELDING APPARATUS AND THE LIKE
Filed Feb. 9, 1925  2 Sheets-Sheet 2
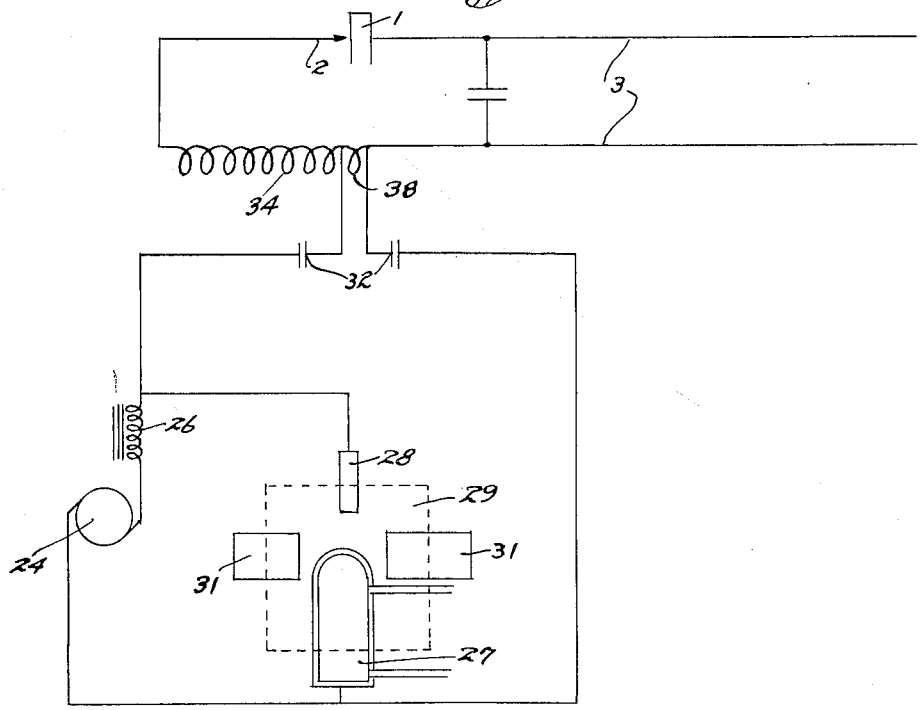
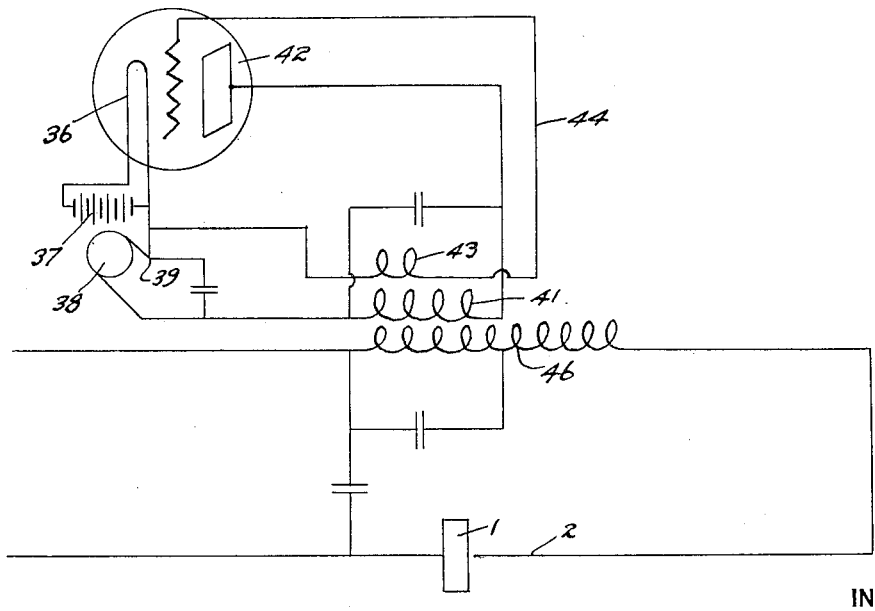
INVENTOR
FLETCHER L. WALKER, JR.
BY
ATTORNEY Patented Jan. 26, 1926.

1,570,803

UNITED STATES PATENT OFFICE.

FLETCHER L. WALKER, JR., OF WESTWOOD, CALIFORNIA.

METHOD FOR STARTING AN ARC IN A WELDING APPARATUS AND THE LIKE.

Application filed February 9, 1925. Serial No. 8,013.

*To all whom it may concern:*

Be it known that I, FLETCHER L. WALKER, Jr., a citizen of the United States, and a resident of Westwood, in the county of Lassen and State of California, have invented a new and useful Improvement in a Method for Starting an Arc in a Welding Apparatus and the like, of which the following is a specification.

The present invention relates to improvements in a method for starting and maintaining an arc between two spaced electrodes in cases where a heavy flow of current is used at a low voltage.

My method has particular reference to the welding arc and contemplates the superimposing of a high voltage high frequency current of small amperage on the circuit containing the low voltage source of energy for the purpose of causing the high voltage current to jump across the gap under conditions which would not allow the low voltage current to become active. While my method may be applied to various electrical devices, I have particularly developed the same in connection with the welding arc and in connection with an electric furnace and, particularly in the former application, I find it best to use a high frequency current of high voltage since a high frequency current is less apt to injure the operator if he should come in contact with the same.

Further objects and advantages of my invention will appear as the specification proceeds.

The preferred forms in which my method may be carried out are illustrated in the accompanying drawings, in which Figure 1 shows an arc welding circuit utilizing a spark gap for producing high frequency high voltage oscillations.

Figure 2 a similar arrangement using the Poulsen arc for producing the oscillations.

Figure 3 a similar arrangement using a vacuum tube for producing oscillations, and Figure 4 an application of my invention to an electric furnace.

While I have shown only the preferred forms of the invention, it should be understood that various changes or modifications may be made within the scope of the claims hereto attached without departing from the spirit of the invention.

In the arrangement shown in Figure 1, the object to be operated on is designated 1 and the welding rod is designated 2. The line wires 3 are connected to the coils 4 encircling two legs of the iron core 6 of the transformer 7. The two other coils 8 constitute the secondary of the transformer and, being of less windings than the primary coils, are connected with the object 1 and the welding rod 2 respectively so that a low voltage is impressed upon the welding circuit which may cause a heavy flow of current through the circuit for melting the metal. A coil 9 of very few windings forms part of the circuit. The latter coil also forms part of an oscillatory circuit including the condensers 11 and 12 and the spark gap 13 which latter is in series with the secondary 14 of a step-up transformer 16, the primary 17 of which is connected to the line wires 3.

Assuming that the line wires carry a sixty cycle current of 2,300 volts, this voltage is stepped down to a few volts in the transformer 6 so that the windings 8 and the welding circuit carry a large amperage at a small voltage. As used at the present time considerable difficulty is experienced with the welding rod sticking to the work when establishing the arc. The operator must strike the work with the welding rod and withdraw it before it fuses to the work. If it fuses to the work, the operator must wrench it loose and in doing so draws the arc too far and the latter extinguishes which necessitates the repetition of the above process. The introduction of the high frequency high voltage current into the circuit which jumps the gap and ionizes the air as soon as the welding rod is brought close to the work facilitates this operation. The high frequency high voltage current is produced by the spark gap arrangement previously described, the current from the line wires being stepped up to high voltage in the transformer 16, the secondary of which charges the condenser 11 until the latter discharges across the gap 13, creating thereby high frequency oscillations which pass through the condensers 11 and 12 and the coil 9 forming part of the welding circuit. The coil 9 may be enlarged by the additional turns 18 and 19, the whole acting as an auto-transformer for further stepping up the voltage of the high frequency current flowing through coil 9. The condenser 12 is of small capacity and does not allow the high voltage low frequency current of the secondary 14 of the transformer to enter the inductance 9 in any appreciable quantities. The high frequency current is by-passed so as to avoid the coils 8 by a large capacity condenser 21 and the transformer 6 is furthermore constructed with primary and secondary coils arranged at right angles to eliminate radio frequency oscillations flowing through the coils 8 that might produce high frequency currents in the coils 4 to kick back into the power supply. Any flux caused by the radio frequency current that would try to thread through the primary of this transformer by passing through the iron core would be almost eliminated by hysteresis losses in the iron. As a further safety measure, I provide the kick back preventer shown as connecting the line wires and comprising a condenser 22 and the high resistance 23.

In Figure 2 is shown a Poulsen arc circuit for producing the high frequency oscillations. The circuit as such is well known and comprises a direct current generator 24 sending a current through the choke coil 26, the copper electrode 27 and the carbon electrode 28 which latter are spaced to produce a gap in the hydro-carbon atmosphere at 29 between the magnets 31. An oscillatory circuit comprising the condensers 32 and a small portion 38 of the auto-tranformer 34 connects the two electrodes in parallel with the generator. The line wires are shown at 3, the work at 1, and the welding rod at 2.

In Figure 3 I show a vacuum tube as a generator of electrical oscillations of high frequency. The filament 36 is lit by a battery 37 and a direct current generator 38 connected at one end to the battery, as shown at 39, is connected at its other end with the coil 41 which latter is connected with the plate 42. The coil 43 of the grid circuit is inductively coupled to the coil 41 and oscillations produced in the coils 41 and 43 are induced in the coil 46 which latter forms part of the welding circuit.

In Figure 4 is shown an application of my principle to the circuit of an electric furnace, such as shown at 47, having the two electrodes 48 suitably mounted in the crucible 49. A supply of direct or alternating current is furnished by the line wires 50 and high frequency high voltage oscillations are produced in the circuit by the spark system shown in connection therewith and marked with numerals corresponding to those shown in Figure 1.

It is evident that in suitable places direct current might be substituted for the alternating current used in the device illustrated and that for instance a direct current generator might take the place of the transformer 7 in Figure 1.

I claim:

1. An electric circuit made for heavy current flow and having a low voltage source of energy and spaced electrodes therein and means for superimposing a high voltage of high frequency on the circuit made for causing a small current to bridge the space between the electrodes for starting heavy current from the low voltage source, the said means comprising a coil in the circuit and an audion oscillator inductively connected with the coil.

2. An electric circuit made for heavy current flow and having a low voltage source of energy and spaced electrodes therein and means for superimposing a high voltage of high frequency on the circuit made for causing a small current to bridge the space between the electrodes for starting heavy current from the low voltage source, the said means comprising a coil in the circuit and an audion oscillator inductively connected with the coil, the coil having turns of wire in series therewith for stepping up the voltage in the first mentioned circuit.

FLETCHER L. WALKER, Jr.